R. S. WHITNEY.
BUMPER FOR MOTOR CARS.
APPLICATION FILED AUG. 6, 1919.
1,375,244.
Patented Apr. 19, 1921
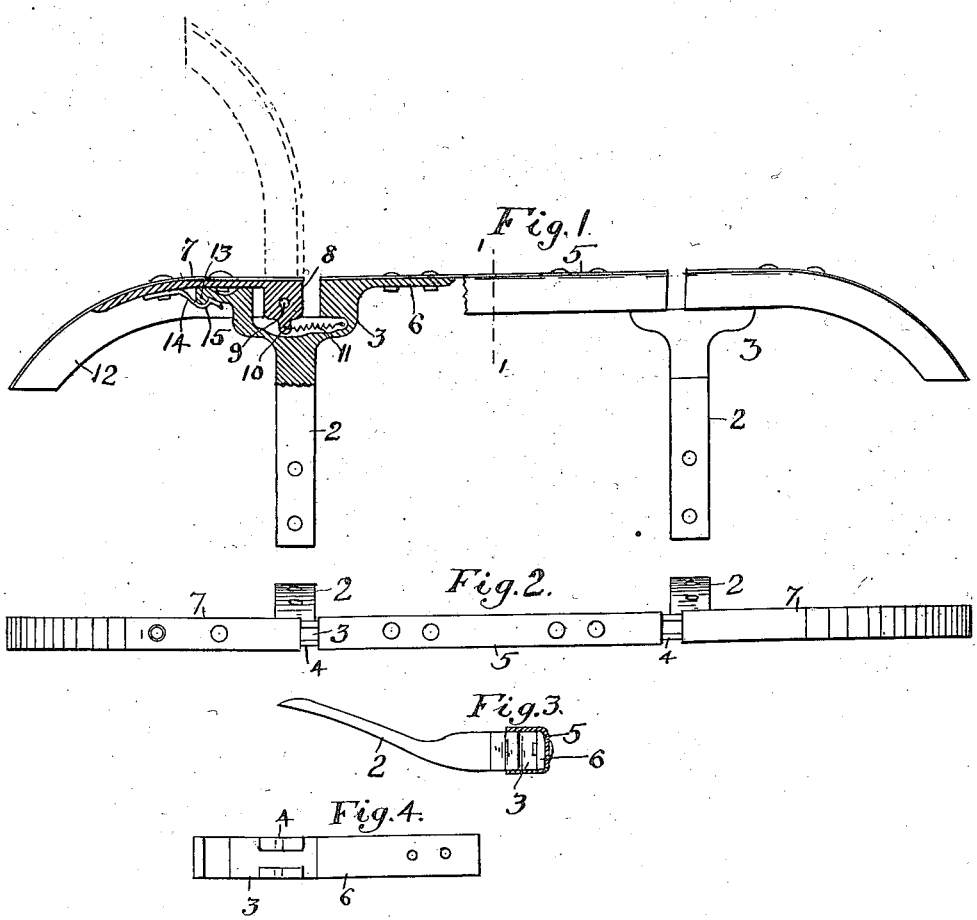
Inventor:
Rolvin S. Whitney
by S. W. Bates Atty.

UNITED STATES PATENT OFFICE.

ROLVIN S. WHITNEY, OF LEWISTON, MAINE.

BUMPER FOR MOTOR-CARS.

1,375,244.

Specification of Letters Patent. Patented Apr. 19, 1921.

Application filed August 6, 1919. Serial No. 315,595.

*To all whom it may concern:*

Be it known that I, ROLVIN S. WHITNEY, a citizen of the United States, residing at Lewiston, in the county of Androscoggin and State of Maine, have invented certain new and useful Improvements in Bumpers for Motor-Cars, of which the following is a specification.

My invention relates to bumpers for automobiles and motor cars.

The bumpers now in ordinary use consist of transverse bars which may be secured to the car in front or in the rear and their purpose is to protect the car from injury if run into in front or in the rear.

The transverse bar is usually fastened to the spring of the car by hangers and that portion of the bar which comes outside of the hanger is liable to catch on posts, trees etc.

This is particularly true when the car is being turned around especially in a contracted space and it often happens that the projecting end of the bumper is out of sight from the driver and when the bumper gets caught something is liable to get broken.

The object of my invention is to construct the bumper so that if it gets caught it will free itself easily and nothing will be injured.

I accomplish this purpose by hinging a section at the end of the bar in such a way that it will yield in a direction away from the car and remain rigid against a pressure acting toward the car or such a pressure as the bumper is ordinarily adapted to resist.

In the accompanying drawing, I have illustrated a bumper constructed in accordance with my invention in which:

Figure 1 is a partial plan and partial horizontal section of my bumper,

Fig. 2 is a front elevation,

Fig. 3 is a section on the line 1—1 of Fig. 1 and

Fig. 4 is a front elevation of the forward end of one of the hangers somewhat enlarged.

Referring to the drawing, 2, 2, represents two suitable hangers by which the bumper is attached to the car and hangers may be constructed to fit any of the well known cars. The hangers are usually made to be attached to the front springs. The hangers support a transverse bar, each end of which is provided with an end section hinged or pivoted to the main bar so that it is yieldable in a direction away from the car, but rigid in the opposite direction.

As here shown, the forward end of each of the hangers is formed into a hollow or recessed head 3 having two forward projecting lugs 4 between which the hinged, or pivoted end section is secured and a laterally projecting arm 6.

The main portion of the transverse bar 5 is U-shaped in cross section and extends from one hanger to the other. The arm 6 formed on the head 3 fits within the channel bar and is riveted thereto with suitable rivets.

The pivoted, or yieldable, end section is made up of an arm 7 having a hub 8 hinged or pivoted by a pin 9 which passes through the lugs 4 and the hub 8. A retracting spring 11 is connected at one end to an offset 10 which is formed on the hub 8 and at the other end to the interior of the head 3. The end section of channel bar 12 is riveted over the arm 7, the latter being made just wide enough to slip inside the bar. The arm 7 when in its normal position, rests against the stop or shoulder 13, the spring 11 keeping it firmly pressed against this shoulder.

As here shown, the end section is formed so that it curves backward toward the body of the car.

The arm 7, when anything as a post or tree gets caught behind it, is free to turn up into the position indicated in dotted lines in Fig. 1 against the action of the spring 11. When the obstruction is removed, the spring pulls the arm back to its normal position resting against the shoulder 13.

The pivoted arm is locked in place against easy displacement by a retaining spring 14 on arm 7 which snaps over a projection 15 formed on the head 3. It is to be understood that the heads on both the hangers 2 are constructed in substantially the same way except that they are reversed.

It will be seen that if any obstruction catches behind the arm 12, the automobile can readily relieve itself by moving forward or backward.

Any pressure brought to bear from in front like the backing up of another automobile will be readily resisted by my bumper, but it will readily disentangle itself when caught by a tree or post or any like obstruction.

While I have shown my invention as applied to bumpers of the channel bar type, it is applicable to bumpers having round, square, flat or spring bars or any form of bumper having transverse bars with projecting ends liable to be caught by posts or other obstruction.

It is also evident that the bumper may be applied to any motor vehicle.

I claim:

1. In a bumper for motor cars, the combination of a transverse bar, a pair of hangers for securing said bar to the car, each of said hangers terminating in a recessed head an end section hinged by its inner end in each of said recessed heads and springs within said heads for retracting said sections to their normal position.

2. In a bumper for motor cars, the combination of a hanger for attachment to the car said hanger having a recessed head, a transverse bar secured to said head, a supporting arm pivoted in said head and yieldable in a direction away from the car, a spring in said head for retracting the arm to its normal position and a bar section having a U-shaped cross section secured to said arm.

In testimony whereof I affix my signature.

ROLVIN S. WHITNEY.